No. 775,033. PATENTED NOV. 15, 1904.
M. B. GOOING.
TWO-ROW PLANTER.
APPLICATION FILED FEB. 25, 1904.
NO MODEL. 2 SHEETS—SHEET 1.
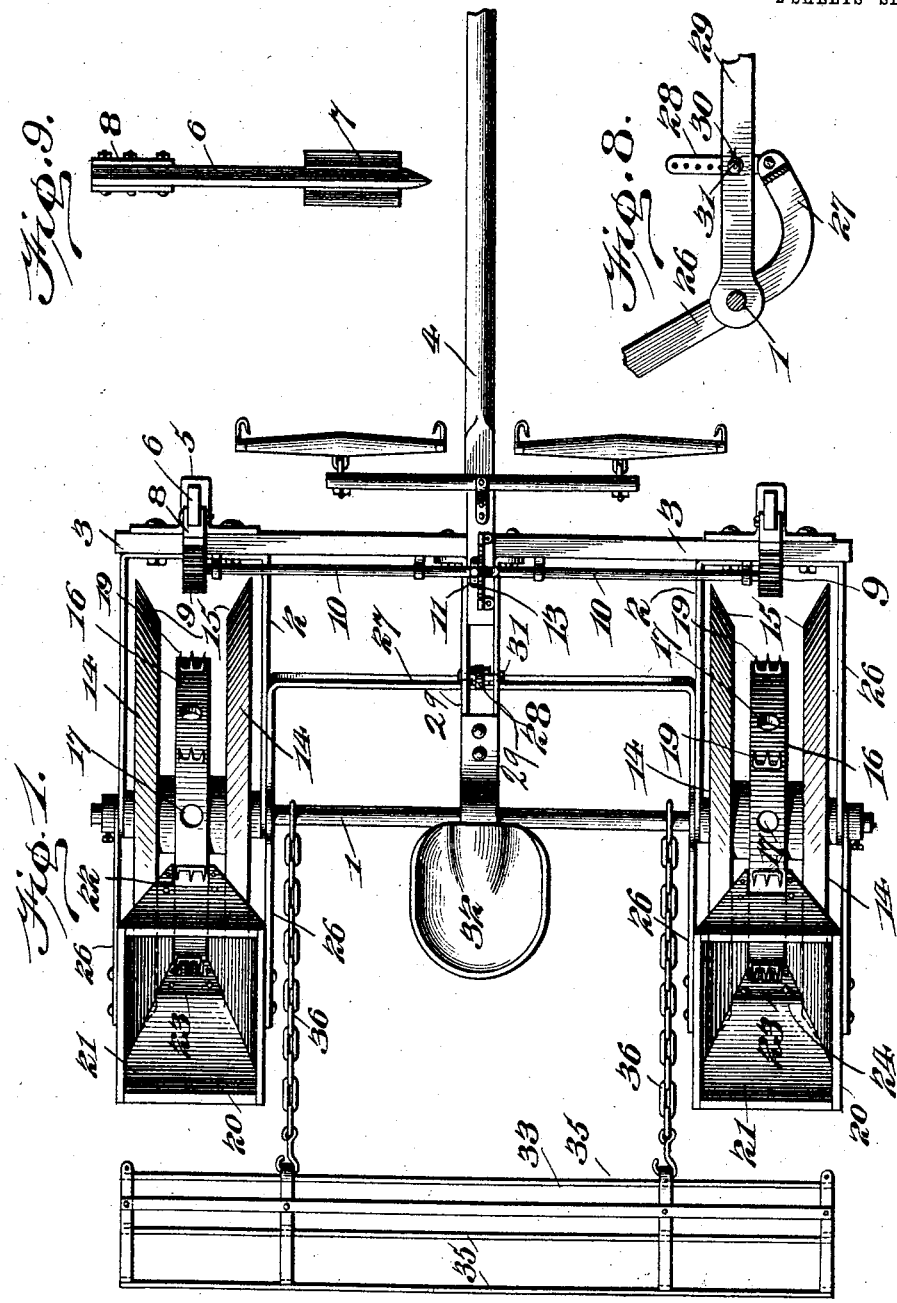
Witnesses
H. G. Dieterich
N. H. Simms
Inventor
Martin B. Gooing
By Knight Bros
Attorneys

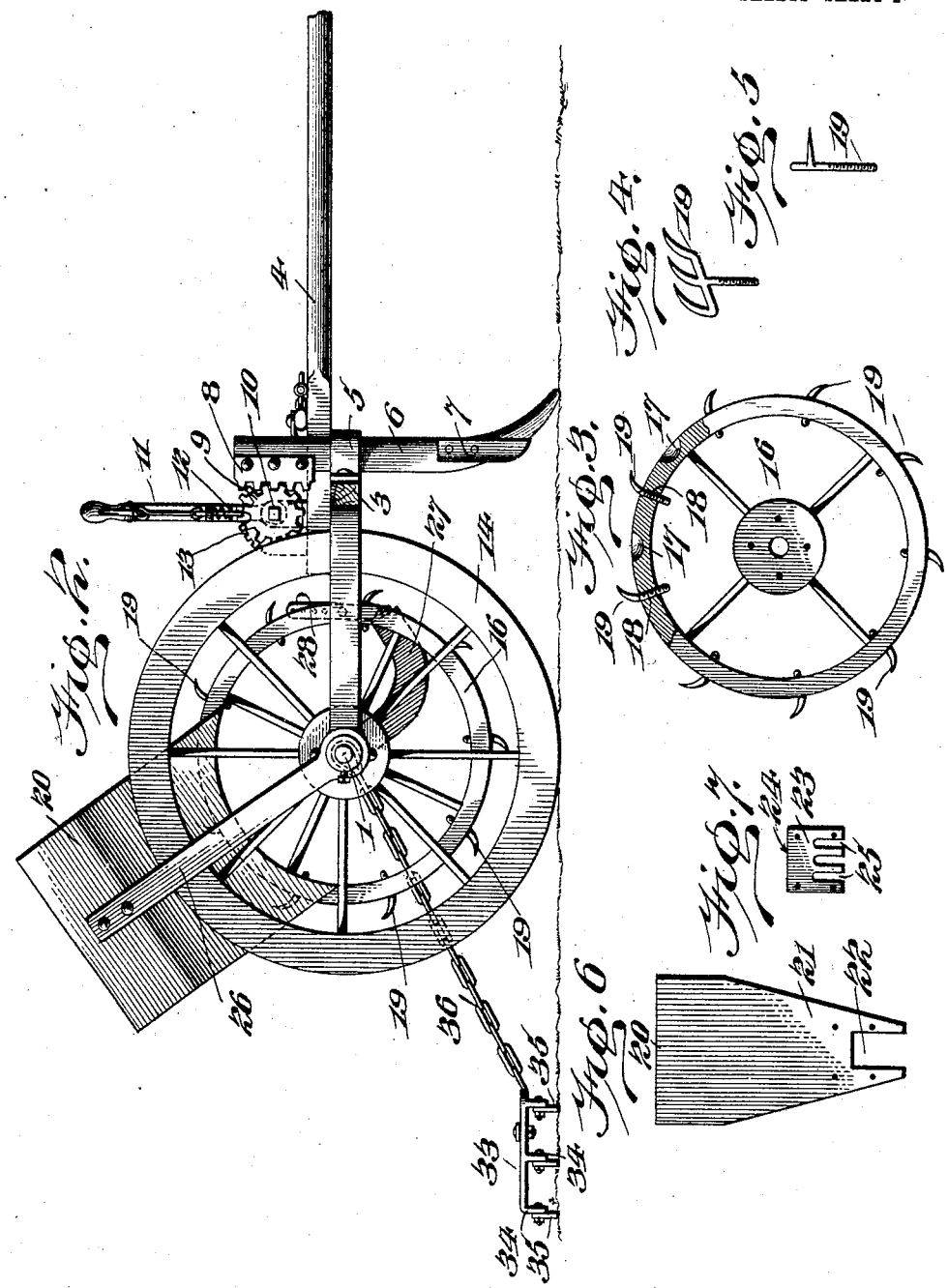

No. 775,033. Patented November 15, 1904.

UNITED STATES PATENT OFFICE.

MARTIN BIRD GOOING, OF FRENCH VILLAGE, ILLINOIS, ASSIGNOR OF ONE-HALF TO JOHN B. FRANCOIS, OF FRENCH VILLAGE, ILLINOIS.

TWO-ROW PLANTER.

SPECIFICATION forming part of Letters Patent No. 775,033, dated November 15, 1904.

Application filed February 25, 1904. Serial No. 195,287. (No model.)

*To all whom it may concern:*

Be it known that I, MARTIN BIRD GOOING, a citizen of the United States, residing at French Village, in the county of St. Clair, State of Illinois, have invented certain new and useful Improvements in Two-Row Planters, of which the following is a specification.

This invention relates to seed-planters; and it has for its object to provide an improved machine of this class by which any kind of seed may be planted.

Other objects and advantages will appear in the following description and will be pointed out more particularly in the claims.

In the drawings, Figure 1 is a top plan view of my planter. Fig. 2 is a side elevation. Fig. 3 is a side elevation of my improved feeder-wheel. Figs. 4 and 5 are removable prongs or forks for the feed-wheel. Figs. 6 and 7 are detail views of the hopper of my machine. Fig. 8 is a detail view of my hopper-moving means, and Fig. 9 is a front elevation of one of the plows.

Referring more particularly to the drawings, 1 indicates the axle of the planter, from each end of which extends a U-shaped bracket 2, the two brackets being connected together by a bar 3, from which projects forwardly the pole 4. Near each end of the bar 3 is a guide 5, in which works the standard 6 of the plow 7. Both plows 7 are provided at their upper ends with racks 8, with which mesh pinions 9, secured on a shaft 10, suitably journaled on the machine and having rigidly connected thereto a lever 11, by which it is rotated to rotate both pinions 9 simultaneously, and consequently move both plows together. The shaft 10 is held in its various positions by means of a dog 12, engaging with a semicircular rack 13 on the frame of the planter.

Journaled in the rear of the plows 9, each one between one of the U-shaped brackets 2 on the axle 1, are the combined feed-wheels and coverers, the coverers serving as the wheels by which the planter is moved.

The coverers each consist of two wheels 14, beveled at 15 on their adjacent faces and connected together by the hub of the feed-wheel 16, positioned between them. The feed-wheels 16 are provided with cups 17 in their peripheries and also openings 18, in which are removably secured prongs or forks 19.

The peripheries of the feed-wheels work through hoppers 20, each of which has its end walls 21 slotted at 22 for the passage of the prongs 19 and the periphery of its adjacent feed-wheel 16.

One of the end walls of each hopper has removably secured over its slot 22 a plate 23, one edge of which is straight, so as to conform to the periphery of the feed-wheel and prevent the passage of seed, such as corn, between the straight edge 24 and the periphery, the corn dropping in the cups 17 in the periphery being carried through the other or front slotted end wall and dropped in advance of its coverer. The plate 23 has also an edge provided with recesses 25 for the passage of the prongs 19 of the feed-wheel, so that potatoes or cotton-seed with lint thereon may be caught and dropped. The three-tined prong, as shown in Fig. 4, is adapted for whole potatoes, while the single prong, as shown in Fig. 5, is preferred for small pieces of potatoes, the prongs in both forms being turned in the direction of the movement of the feed-wheel.

The hoppers 20 are each movable around the center or axis of the feed-wheels 16, so that even when the hoppers are nearly empty the seed therein will be thrown to a position to be caught either by the prongs when the prongs are employed or the cup when said cups form the dropping element. For this purpose each hopper is supported by two arms 26 from the axle 1, and one arm of each hopper is connected with a swinging frame 27, the swinging movement of which is controlled by a perforated link 28, connected at one end to said frame 27 and working at its other end between two bars 29, connecting the bar 3 and the axle 1. These bars 29 are provided with two horizontally-alined perforations 30 and a pin 31, passed through these perforations and the perforations in the link 28, and holds the frame 27 in its various positions.

The seat 32 is supported on the bars 29.

In the rear of the coverers is a leveler 33, which has a plurality of depending integral bars 34, to which are removably secured the plates 35, the leveler being connected with the axle 1 by a chain 36.

The operation of the invention is as follows: Assuming the hopper 20 to be filled with corn and in its lowest position and the plate 23 to be disposed so that the edge of the same will be but a slight distance from the periphery of the feed-wheel 16, thereby preventing the passage of the seed between the parts, the plows 7 are then simultaneously adjusted, by means of the lever 11, to a depth required for the seed to be deposited. As the planter moves the plows 7 cut furrows, and each feed-wheel 16 passes through its hopper 20, taking out through the front slot 22 seed in the cups 17 and drops the same slightly in advance of that portion of the covering-wheels 14 which contacts with the ground. The bevel-faces 15 when they reach the seed thus dropped close over the seed deposited in the furrow made by the plow 7, and the leveler 33 then smooths the ground. As the hoppers feed out their contents they are raised by removing the pin 30 from one perforation of the link 28, depressing the link 28, and placing the pin in another perforation, so that the contents will always be in a position to be caught by the feed-wheels 16.

If it is desired to plant potatoes or cotton-seed, the prongs 19 are fitted in the openings 18, and the plate 23 is turned so that the recesses 25 are next to the periphery of the feed-wheel.

Various changes in form, proportion, and minor details of construction may be made without departing from the spirit of my invention.

Having thus described my invention, what I claim is—

1. In a planter, the combination with a rotary feed-wheel, of a hopper for feeding the seed to the wheel, and means for swinging the hopper in a path concentric with the axis of the feed-wheel.

2. In a planter, the combination of a hopper, a rotary feed-wheel, and a reversible plate carried by the hopper and against which the wheel works, and having an edge provided with recesses, and an edge conforming to the periphery of the feed-wheel.

3. In a planter, the combination of a hopper, a rotary feed-wheel provided with cups in its periphery and means for securing prongs on its periphery, and a reversible plate carried by the hopper and having an edge conforming to the periphery of the feed-wheel and an edge provided with recesses through which prongs may work.

4. In a planter, the combination of a pair of covering-wheels turning together about the same axis and beveled on their adjacent faces, a feed-wheel arranged between covering-wheels and turning on the same axis with the same, and a hopper movable in a path concentric with the axis of the covering and feed wheels.

5. In a planter, the combination of a pair of covering-wheels having their adjacent side faces beveled, a feed-wheel located between the covering-wheels and turning with the same, and a hopper through which the periphery of the feed-wheel works, and means for swinging the hopper around the axis of the feed-wheel.

6. In a planter, the combination of an axle, a pair of covering-wheels arranged on the axle, having their adjacent faces beveled, a feed-wheel arranged between the covering-wheels and turning with the same on the axle, a hopper for the feed-wheel, and swinging arms connecting the hopper and the axle.

7. In a planter, the combination of an axle, a plurality of pairs of covering-wheels arranged on the axle each pair having adjacent faces beveled, a feed-wheel arranged between each pair of covering-wheels and turning with the same, hoppers for the feed-wheels, arms connecting the hoppers and the axle; and means for swinging together all the hoppers around the axle.

8. In a planter, the combination of an axle, a plurality of pairs of covering-wheels arranged on the axle each pair having adjacent faces beveled, a feed-wheel arranged between each pair of covering-wheels and turning with the same, a hopper for each feed-wheel, arms connecting the hoppers and the axle, a swinging frame connecting both hoppers, a link connected to the frame, and means for holding the link in its various positions.

9. In a planter, the combination of an axle two pairs of covering-wheels arranged on the axle, each pair having their adjacent faces beveled, a feed-wheel located between the covering-wheels and turning with the same, a hopper for each feed-wheel, arms connecting the hoppers and the axle, two U-shaped brackets connected to the axle, one about each pair of covering-wheels, a bar connecting the U-shaped brackets, a pole connected to the bar, and vertically-adjustable plows also arranged on the bar.

10. In a planter the combination with a plow and a coverer arranged in the rear of the plow, of a leveler arranged in the rear of the coverer and comprising a frame having integral depending bars, and plates removably secured to the bars.

The foregoing specification signed this 10th day of February, 1904.

MARTIN BIRD GOOING.

In presence of—
T. J. BRODNAX,
GEO. HAYDEN.